United States Patent [19]

Lindner

[11] 4,286,650

[45] Sep. 1, 1981

[54] METHOD FOR CHARGING OR DISCHARGING A HEAT ACCUMULATOR

[75] Inventor: Friedrich Lindner, Stuttgart, Fed. Rep. of Germany

[73] Assignee: Deutsche Forschungs- und Versuchsanstalt für Luft- und Roumfabert e.V., Bonn, Fed. Rep. of Germany

[21] Appl. No.: 48,764

[22] Filed: Jun. 14, 1979

[30] Foreign Application Priority Data

Jun. 16, 1978 [DE] Fed. Rep. of Germany ....... 2826405

[51] Int. Cl.³ ............................................. F23D 15/00
[52] U.S. Cl. ...................................... 165/1; 126/435; 126/436; 165/111; 165/104.13
[58] Field of Search ....................... 165/104 S, 111, 1; 126/400, 436, 435

[56] References Cited

U.S. PATENT DOCUMENTS

| | | | |
|---|---|---|---|
| 2,396,338 | 3/1946 | Newton | 165/104 S X |
| 3,848,416 | 11/1974 | Bundy | 165/111 X |
| 3,988,895 | 11/1976 | Sheinbaum | 60/641 |
| 4,086,958 | 5/1978 | Lindner et al. | 165/111 X |
| 4,089,175 | 5/1978 | Woinsky | 60/641 |
| 4,182,409 | 1/1980 | Robinson, Jr. | 165/104 S |

*Primary Examiner*—Albert W. Davis
*Attorney, Agent, or Firm*—Laubscher & Laubscher

[57] ABSTRACT

A method of charging and discharging a heat accumulator is disclosed, wherein a heat exchange medium is passed through a heat accumulator medium. The heat exchange medium can either be heated or cooled external to the heat accumulator medium. If it is heated, it gives up its heat to the accumulator medium, and in doing so changes from the gaseous to the liquid state. If it is cooled, it absorbs heat from the accumulator medium, and in doing so changes from the liquid to the gaseous state. In both cases, the opposite change of state is brought about by the heating or cooling external to the heat accumulator medium.

5 Claims, 4 Drawing Figures

METHOD FOR CHARGING OR DISCHARGING A HEAT ACCUMULATOR

FIELD OF THE INVENTION

The invention relates to a method for charging or discharging a heat accumulator with a heat accumulator medium, which may or may not undergo a phase change, in which a heat exchanger medium is fed directly into the heat accumulator medium and is subsequently again separated therefrom.

BACKGROUND OF THE INVENTION

Methods for charging and discharging heat accumulators are known (for example German patent application P No. 26 07 168.1-13 corresponding to U.S. Pat. No. 4,086,958, in which a liquid heat exchange medium is conducted through a heat accumulator medium, the heat exchanger medium being immiscible with the heat accumulator medium. After passage of the heat exchanger medium through the heat accumulator medium, in the course of which heat transfer takes place, the heat exchanger medium again separates from the heat accumulator medium, collecting for example in a layer above the heat accumulator medium from where it can be conveyed again to a cooling circuit or into a heating circuit. It is possible to employ the same heat exchanger medium both for charging and discharging. During discharging, the heat exchanger medium collected above the heat accumulator medium is fed to a heat exchanger, in which it gives off heat. Following this, the cooled heat exchanger medium again enters the heat accumulator medium and extracts heat therefrom. During the charging of the heat accumulator, the heat exchanger medium collected above the heat accumulator medium is fed to a heat source and from there conveyed in the heated state into the heat accumulator medium where it again gives off the absorbed heat.

Such heat accumulators with a direct contact heat exchanger, that is to say, with a heat exchanger medium which is not miscible with the heat accumulator medium, operate particularly advantageously in the case of latent-heat accumulators, that is to say, heat accumulators in which the accumulator medium undergoes phase changes between the solid and the liquid phase during charging and discharging.

Difficulties arise in heat accumulators with direct contact owing to the fact that in spite of the non-miscibility of the heat accumulator medium and the heat exchanger medium, a complete separation of heat exchanger medium and heat accumulator medium is difficult to achieve. The reason for this is in particular that the heat exchanger medium passes through the heat accumulator medium with considerably high velocity at times and in doing so entrains the heat accumulator medium. This not completely avoidable entrainment of the heat accumulator medium can lead to fouling and eventually a blocking of the circuits designed to carry only the heat exchanger medium.

Direct contact heat accumulators also have the further disadvantage that, as a rule, only one exchanger circuit can be led through the accumulator, using the non-miscible heat exchanger medium. It is not possible to pass several cycles through the heat accumulator medium.

SUMMARY OF THE INVENTION

The underlying purpose of the invention is to improve the separability of heat exchanger and heat accumulator media and/or to make possible the use of several heat exchanger circuits even in a heat accumulator through which the heat exchanger medium is openly conveyed in direct contact with the heat accumulator media.

According to the invention, this purpose is achieved by using a heat exchanger medium which changes from the gaseous into the liquid state when giving off heat and from the liquid into the gaseous state when absorbing heat.

When, after passage through the heat accumulator medium and the heat absorption associated therewith, the heat exchanger medium is present in the gaseous state, the separability between heat accumulator medium and the gaseous heat exchanger medium will be substantially better than in the case where the heat exchanger medium is also in the liquid state. Owing to the fact that the heat exchanger medium is not gaseous during the entire cycle but is in the liquid state in one portion of the cycle, the amount of heat transferable by the heat exchanger medium is substantially greater than in the case of a wholly gaseous heat exchanger medium, because the latent heat also contributes to the heat exchange.

It is advantageous if, at the same time, a further heat exchanger medium is conveyed through the heat accumulator medium, which further heat exchanger medium does not undergo a change of state during absorption and discharge of heat.

Because one of the two heat exchanger mediums, which simultaneously pass through the heat accumulator medium and are not miscible with the latter, is in the gaseous state after heat absorption, separation of the two heat exchanger mediums can be effected directly, without requiring any complicated separating devices. The two heat exchanger mediums can even be miscible with each other, because a perfect separation is provided for in any event when one of them changes state.

In a preferred embodiment of the invention, a second heat exchanger medium can be passed through the heat accumulating medium simultaneously with the first, the second medium also changing state during operation. One, heat-suplying heat exchanger medium, is liquid at the operating temperature of the heat accumulator medium, whereas the other, heat-extracting heat exchanger medium, is gaseous at this temperature.

Thus, in this embodiment, two heat exchanger media are employed which undergo a change of state during heat absorption and heat discharge, respectively. After passage through the heat accumulator medium, the two heat exchanger media are substantially at the operating temperature of the accumulator medium, one heat exchanger medium being present in the liquid state and the other in the gaseous state, so that again a direct separation of the two heat exchanger media is possible.

To improve the separation effect between the heat exchanger medium and the heat accumulator medium, provision may be made for a barrier layer between the accumulator medium and the liquid heat exchanger medium. The barrier layer may consist of a liquid which is not miscible with either the heat accumulator medium or with the liquid heat exchanger medium and the specific weight of which is between that of the liquid heat exchanger medium and the heat accumulator medium.

The heat exchanger medium which undergoes a change of state is preferably a partly substituted fluorohydrocarbon.

Silicone oil is a preferred substance for the formation of a barrier layer.

BRIEF DESCRIPTION OF THE DRAWING

The following description of preferred modes of execution of the invention serves, in association with the drawing, for the purpose of a more detailed explanation. In the drawing.

DETAILED DESCRIPTION OF PREFERRED EMBODIMENTS

Figure 1:
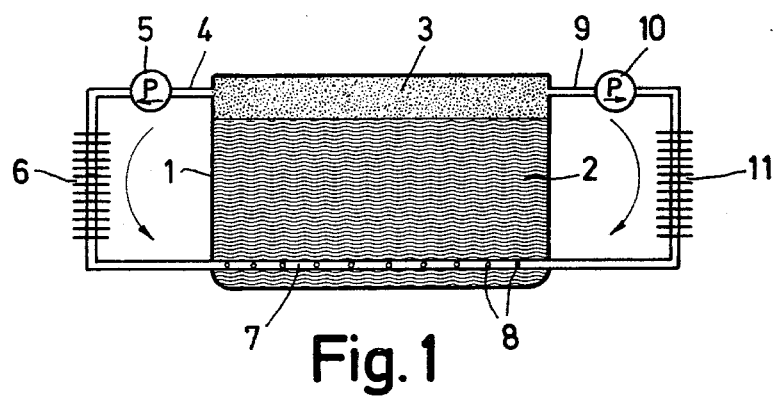
FIG. 1 is a schematic view of a heat accumulator taken with a charging circuit and a discharge circuit with one heat exchanger medium.

In FIG. 1, a heat accumulator tank 1 is shown filled with a heat storage or accumulating medium 2, which is preferably a latent heat retaining substance such as Glauber's salt or the like, but which may also be another substance of a nature such that it does not change its state during charging and discharging.

Above the heat storage medium 2, a heat exchanger medium 3 is located, which can be conveyed through a charging circuit or a discharging circuit to circulate through the heat accumulator medium. The thermal circuit, i.e. the circuit which leads to heating of the medium 2, includes a suction outlet line 4, a pump 5, a heat exchanger 6 and a discharge line 7 terminating in the interior of the accumulator tank 1, which line has openings 8 forming outlets for the heat exchanger medium.

The construction of the discharge circuit, i.e. the circuit which leads to cooling of the medium 2, is practically the same. It includes a suction outlet line 9, a pump 10, a heat exchanger 11 and a discharge line which, in the embodiment here shown is identical to the discharge line 7, but can of course also be a separate discharge line.

The heat exchanger medium 3 is so selected, that on heating it changes from the liquid into the gaseous state, or during cooling it changes from the gaseous into the liquid state. For example, the heat exchanger medium in the example of FIG. 1 can be gaseous at the operating temperature of the accumulator medium, i.e. the heat exchanger medium is present in the gaseous state above the heat accumulator medium. This provides for an excellent separation between the heat exchanger medium and the heat accumulator medium. The heat exchanger medium then remains gaseous in the charging circuit, and is liquefied within the discharge circuit in the heat exchanger 11 and returned into the gaseous state again on passing through the heat accumulator medium.

It would of course also be possible to select the heat exchanger medium in such a manner, that it is a liquid at the operating temperature of the heat accumulator, so that it would be present in the liquid state above the heat accumulator medium. In this case, the heat exchanger medium would always remain liquid in the discharge circuit, while it will be converted in the heat exchanger 6 of the charging circuit into the gaseous state to be liquefied again during its subsequent passage through the heat accumulator medium.

Figure 2:
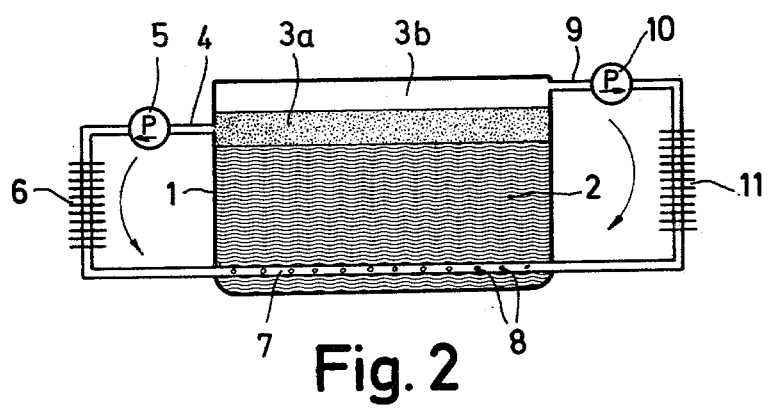
FIG. 2 is a view similar to FIG. 1 of a heat accumulator with two heat exchanger media.

The embodiment illustrated in FIG. 2 substantially corresponds to that of FIG. 1; accordingly, the same parts bear the same reference numerals. This emobodiment differs from that of FIG. 1, in that two heat exchanger media 3a and 3b are used and that the suction lines 4 and 9 emerge at different levels from the space above the heat accumulator medium 2. The heat exchanger medium 3a is so selected, that it is liquid at the operating temperature of the accumulator, while the heat exchanger medium 3b is in the gaseous state at the operating temperature of the accumulator. The heat exchanger medium 3a serves for charging the accumulator, i.e. heating the accumulator medium 2; it can either remain liquid during the whole of the charging process or may change into the gaseous state in heat exchanger 6, in which case it is then again liquefied in the heat accumulator medium. The heat exchanger medium 3b serves for discharging the accumulator i.e. cooling the accumulator medium 2. It is fed to the heat exchanger 11 in the gaseous state, is liquefied therein and is again converted into the gaseous state in the heat accumulator medium. Owing to their different states, the two heat exchanger media separate completely from each other above the heat accumulator medium, so that it is possible to effect charging and discharging of the heat accumulator simultaneously. A mutual impairment of the two heat media does not occur.

The use of heat exchanger media which separate from each other owing to their different states at the operating temperature of the accumulator has been described in the preceding example relative to a charging circuit and a discharging circuit. It is of course also possible to pass two charging circuits through the accumulator medium when using heat exchanger media which assume different states at the operating temperature of the accumulator, because in this case the two heat exchanger media can be directly separated from each other after passing through the accumulator medium.

Figure 3:
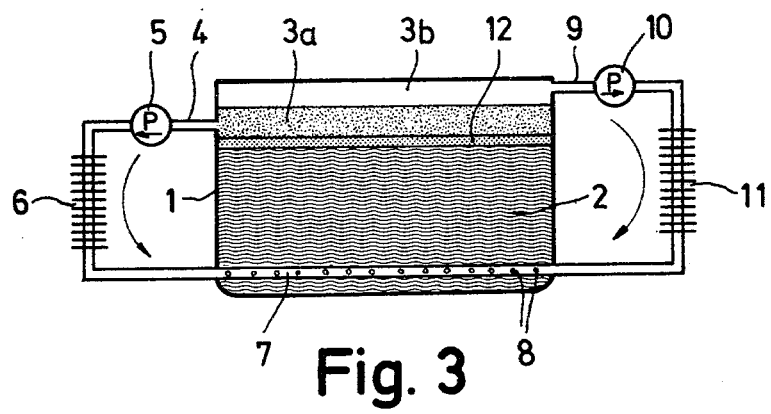
FIG. 3 is a view similar to FIG. 2 of a heat accumulator unit with an additional barrier layer between the heat accumulator medium and the liquid heat exchanger medium.

The accumulator illustrated in FIG. 3 substantially corresponds to that of FIG. 2, corresponding parts being designated by the same reference numerals. In variation relative to the example of embodiment of FIG. 2, in this preferred embodiment there is arranged between the heat accumulator medium 2 and the liquid heat exchanger medium 3a a barrier layer 12, which may for example consist of silicone oil, the specific weight of which is between those of the liquid heat accumulator medium and the liquid heat exchanger medium 3a. This barrier layer prevents an entrainment of the heat accumulator medium by the heat exchanger medium 3a and thus makes possible an improved separation of these two media. Owing to the properties of the barrier layer medium, no mixing occurs between the latter and the heat accumulator and heat exchanger media.

It is of course possible to employ a barrier layer of the type shown in FIG. 3 even in a heat accumulator through which only one heat exchanger medium is passed.

By the use of heat exchanger media undergoing a phase transition, it also becomes possible to effect simultaneously several cycles in heat accumulators operating with direct contact heat exchanger media circulation. As heat exchanger media there can be employed for example concurrently special heat exchanger oils and optionally partially substituted fluorohydrocarbons, in which case the fluorohydrocarbons undergo a phase transition while the oil remains liquid during the whole of the cycle. It is also possible to employ as heat exchanger media two optionally partially substituted fluorohydrocarbons, by selecting substances having different volatilization temperatures in such a manner, that one heat exchanger medium is liquid at the operating temperature of the accumulator medium and the other is in the gaseous state. In addition to the increased variety of operational possibilities of heat accumulators with direct contact heat exchanger media circulation, there is achieved at the same time an improved separation of the heat exchanger and heat accumulator media and thus an environmentally more acceptable operation of a heat accumulator of this kind.

Figure 4:
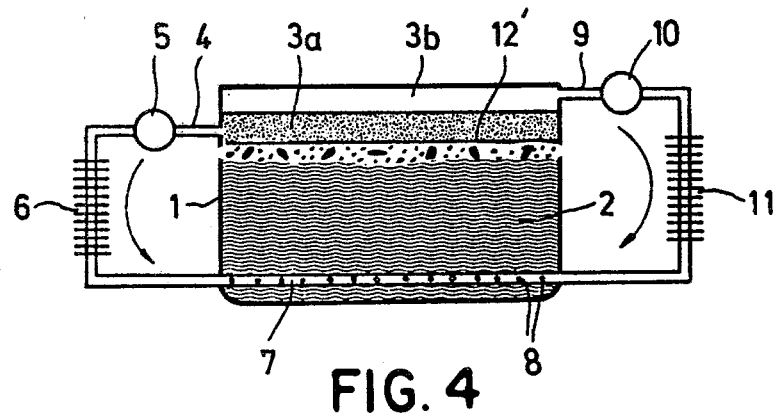
FIG. 4 illustrates an alternate embodiment similar to FIG. 3.

The barrier layer designated with reference numeral 12 in FIG. 3 can also be formed by solid particles 12' floating on the heat accumulator medium, for example by small spheres or rods as shown in FIG. 4.

I claim:

1. A method for charging and discharging a heat accumulator, comprising the steps of
   (a) introducing into the accumulator a latent heat-retaining storage medium (2) having a first heat condition;
   (b) introducing into the accumulator in direct contact with said heat-retaining storage medium a heat exchanger fluid medium having a liquid state; and
   (c) introducing a liquid barrier layer between said heat-retaining storage medium and said heat exchanger fluid medium, said liquid barrier layer being immiscible with both said heat-retaining storage and said heat exchange fluid mediums, said barrier layer having a specific weight between the specific weights of said heat-retaining storage medium and said heat exchanger medium, said heat exchanger fluid medium being operable to change said heat-retaining storage medium from said first heat condition to a second heat conditon.

2. A method as defined in claim 1, wherein said barrier layer comprises silicone oil.

3. A method for charging and discharging a heat accumulator, comprising the steps of
   (a) introducing into the accumulator a latent heat retaining storage medium;
   (b) introducing into the accumulator in direct contact with said heat retaining storage medium a heat exchanger fluid medium having a liquid state; and
   (c) introducing a solid particulate barrier layer between said heat-retaining storage medium and said heat exchanger fluid medium, said heat exchanger fluid medium being operable to change the heat-retaining storage medium from said first condition to a second condition.

4. A method for charging and discharging a heat accumulator, comprising the steps of
   (a) introducing into the accumulator a latent heat-retaining storage medium (2) having a first heat condition;
   (b) introducing into the accumulator a first heat exchanger fluid medium that is immiscible with and in direct contact with said heat-retaining storage medium, said first heat exchanger fluid medium being operable between the liquid and gaseous states to change said heat-retaining storage medium from said first heat condition to a second heat condition; and
   (c) introducing into the accumulator a second heat exchanger fluid medium that is immiscible with and in direct contact with both said first heat exchanger fluid and said heat-retaining storage mediums, said second heat exchanger fluid medium being operable, while remaining in a given physical state, to transfer heat relative to at least one of said storage and said first heat exchanger fluid mediums.

5. A method for charging and discharging a heat accumulator, comprising the steps of
   (a) introducing into the accumulator a first heat-retaining storage medium (2) having a first heat condition;
   (b) introducing into the accumulator a first heat exchanger fluid medium that is immiscible with and in direct contact with said heat-retaining storage medium, said first heat exchanger fluid medium being operable between the liquid and gaseous states to change said heat-retaining storage medium from said first heat condition to a second heat condition; and
   (c) introducing into the accumulator a second heat exchanger fluid medium that is immiscible with and in direct contact with both said first heat exchanger fluid and said heat storage mediums, said first and second heat exchanger mediums being in the liquid and gaseous states, respectively, said liquid exchanger medium being converted to a gaseous state outside of the heat accumulator and reverting to the liquid state within the accumulator, said gaseous exchanger medium being converted to a liquid state outside of the heat accumulator and reverting to the gaseous state within the accumulator to change said heat-retaining storage medium from said second heat condition to a first heat condition.

* * * * *